(12) United States Patent
Lin

(10) Patent No.: US 7,015,280 B2
(45) Date of Patent: Mar. 21, 2006

(54) CONDUCTIVE EMULSION FOR PREPARING SURFACE FOR POWDER COATING

(75) Inventor: Chhiu-Tsu Lin, Sycamore, IL (US)

(73) Assignee: Northern Illinois University, DeKalb, IL (US)

( * ) Notice: Subject to any disclaimer, the term of this patent is extended or adjusted under 35 U.S.C. 154(b) by 236 days.

(21) Appl. No.: 10/392,544

(22) Filed: Mar. 20, 2003

(65) Prior Publication Data

US 2003/0180551 A1    Sep. 25, 2003

Related U.S. Application Data

(60) Provisional application No. 60/366,775, filed on Mar. 22, 2002.

(51) Int. Cl.
*C08K 83/00* (2006.01)
(52) U.S. Cl. ............... 524/858; 252/518.1; 252/519.1; 252/519.31; 252/519.5; 252/519.51; 252/520.1; 252/520.21; 428/450; 524/588
(58) Field of Classification Search ............... 524/858, 524/868, 869; 252/512–515, 518.1–521; 428/446–452
See application file for complete search history.

(56) References Cited

U.S. PATENT DOCUMENTS 5,226,954 A * 7/1993 Suzuki .......................... 106/2
6,294,620 B1 * 9/2001 Huang et al. ............... 525/452

FOREIGN PATENT DOCUMENTS

| DE | 32 11 282 A1 | | 9/1983 |
| JP | 2002-80785 | * | 3/2002 |
| JP | 2005-179402 | * | 7/2005 |

* cited by examiner

Primary Examiner—Marc S Zimmer
(74) Attorney, Agent, or Firm—Kohn & Associates, PLLC; Kenneth I. Kohn

(57) ABSTRACT

An emulsion for preparing a low-conductivity surface for powder coating, the emulsion including an emulsified organofunctional silane solution. A pre-powder coating emulsion provides a surface with conductivity. A non-conductive object having applied to an exterior surface of the object the emulsion including an emulsified organofunctional silane solution.

16 Claims, No Drawings

CONDUCTIVE EMULSION FOR PREPARING SURFACE FOR POWDER COATING

CROSS-RELATED REFERENCE SECTION

This application claims the benefit of priority under 35 U.S.C. Section 119(e) of U.S. Provisional Patent Application No. 60/366,775, filed Mar. 22, 2002, which is incorporated herein by reference.

BACKGROUND OF THE INVENTION

1. Technical Field

The present invention relates to emulsions for preparing a surface for a powder coating. More specifically, the present invention relates to a conductive sol-gel emulsion.

2. Background Art

Coating compositions have long been used to provide the surface of articles with certain desired physical characteristics such as color, gloss and durability. In the past, most coating compositions elied upon a liquid carrier, which evaporated after the composition was applied. Recently, there has been a growing trend toward reducing the volatile organic compounds (VOCs) of coating compositions. One way of achieving this objective has been through the use of dry, solventless systems such as powder coating systems.

In typical powder coating systems, an electrostatic charge is often applied between the application device (e.g., the spray gun) and the item to be painted. This results in attraction and adherence of the powder coating to the desired substrate.

After being applied, the powder coating is cured. Typically, this is achieved by heating the coated substrate to an elevated temperature (e.g., a temperature between 50° C. and 400° C.). During the curing process, the powder particles melt and spread, while the components of the powder coating crosslink. In addition to not emitting any VOCs into the environment during the application or curing processes, such a powder coating system is extremely efficient since there is essentially no waste (i.e., application yield is approximately 100 percent).

Powder coating systems are well known to those skilled in the art. In the coating industry, the term "powder" includes not only materials with a relatively small particle size, but also those with larger sizes, such as granules. Typically, however, the average particle size of most power coating systems are in the range from about 0.1 to about 500 microns; and more commonly, from about 0.5 to about 100 microns.

Powder coating is a well-known method for the coating of objects in which one starts with a powder coating material which is electrically charged and sprayed against the surfaces of an object. The material is finally adhered and converted to a solid state by heating to its melting temperature. Since the powder consists of a plastic, which is cured by heating, it must be heated to a comparatively high temperature, about 200° C.

The coating method can be performed on objects having good heat resistance and a conductive surface. However, where the surface of an object is non-conductive, implying that the object cannot be grounded or supplied with a charge of an opposite polarity to the charge of the powder, difficulties arise with enabling the powder to adhere to the surface of the object during the time between spraying and heating the powder to the melting temperature.

The difficulty of obtaining a polarity difference between the powder and the object, when non-conductive surfaces are involved, has been addressed by either varnishing the object with a conductive varnish, or subjecting the object to water so as to form a conductive moisture layer on the surface. The methods are, however, of limited use because of numerous disadvantages. The disadvantages include the additional operation and material required for varnishing and inferior adhesion as compared to powder coating on a clean surface. Additionally, when utilizing such methods, discoloration can occur with clear varnishes. Further, the addition of water can impair the adhesion of the powder coating and can damage the object by confining the added water beneath the coating.

A further method of enabling the powder to adhere to the surface of a non-conductive object is disclosed in German Patent No. 3,211,282. The '282 patent teaches heating glass objects having good heat resistance to a temperature of 400–900° C. This causes the powder granules that impact the object to melt and stick to the surface. One problem with the method is that objects that are heat sensitive can deform when exposed to high temperatures and cannot be treated at the high temperature required by this method. Thus, the method of the Albers patent cannot be applied to heat sensitive objects such as wood or plastic. There is therefore no method available for powder coating heat sensitive object.

It would therefore, be useful to develop a coating, which overcomes the above problems with regard to wood and plastic while still utilizing the beneficial powder coating technology.

SUMMARY OF THE INVENTION

According to the present invention, there is provided an emulsion for preparing a low-conductivity surface for powder coating, the emulsion including an emulsified organofunctional silane solution. Also provided is a pre-powder coating emulsion that provides a surface with conductivity. A non-conductive object having applied to the exterior surface of the object the emulsion including an emulsified organofunctional silane solution is also provided.

DESCRIPTION OF THE INVENTION

Generally, the present invention provides an environmentally friendly emulsion for use on a surface, preferably a low-conductivity surface. More specifically, the present invention provides a conductive sol-gel emulsion for surface treatment of low-conductivity objects. The emulsion renders the object amenable to powder coating or other treatments that require the surface of an object to be conductive. The sol-gel creates a transparent and high abrasion resistant silicate film on a relative soft substrate (wood or plastics) via hydrolysis and polycondensation reaction. The hard xerogel layer can be easily polished to prepare a mirror-finish flat surface for a high quality powder coating.

The present invention provides a conductive sol-gel emulsion that is a formulation of an emulsified organofunctional silane solution. The solution forms a stable and compatible emulsion with water dispersion of electrical conducting particles. The emulsion of the present invention is based on a "green chemistry" approach to formulate an environmentally friendly, aqueous (solvent-free) conductive sol-gel emulsion for surface treatment of low-conductivity surfaces. Examples of low-conductivity surfaces include, but are not limited to, MDF (medium density fiber board) and ABS (acrylonitrile butadiene styrene).

The conductive sol-gel emulsion of the present invention includes the following: 80–90% by weight of water, 0.1–5% by weight of emulsifiers, 4–10% by weight of organofunctional silanes, 0.2–1% by weight of electrical conducting metal/metal oxide particles, and a trace amount of pH adjusting agents. One of the exact compositions of conductive sol-gel emulsion, for example, contains 2.3 g emulsifiers, 12 g organofunctional silanes, 0.8 g electrical conducting metal/metal oxide particles, 0.1 pH adjusting agents and 154.8 g water.

The phrase "electrical conducting particles" as used herein is intended to include, but is not limited to, ZnO:Al (AZO), $SnO_2$:Sb (ATO), $In_2O_3$:Sn (ITO), $SnO_2$:F (FTO), and other similar conductive metal/metal oxide particles. This list is intended to exemplify, not limit, the electrical conducting particles that can be used in the emulsion of the present invention. Those of skill in the art know additional electrical conducting particles that are of a sub-micrometer or nanometer size that can be utilized in the present invention. The uniformly dispersed electrical conducting particles in the sol-gel emulsion can transform a non-conductive (or low-conductive) surface to a conductive surface amenable for powder coating or other treatments that require the surface of an object to be conductive. The uniformly conductive surface is capable of attracting powder paint particles evenly to the part. A conductive surface results from the application of the emulsion of the present invention. The surface including the emulsion is capable of having a powder coating applied without the additional step of preheating the object. The conductive sol-gel emulsion described in the present invention is particularly useful for the treatment of heat sensitive objects such as wood or plastic.

The term "emulsifier" as used herein is intended to include, but is not limited to, specialty ethoxylates for adjuvancy and emulsification, and sorbitan based derivatives for emulsification and adjuvancy, and other similar emulsifiers. The emulsifiers form latex structures for dispersing organofunctional silanes that then become stable and compatible in the aqueous environment. The list is intended to exemplify, not limit, the emulsifiers that can be used in the emulsion of the present invention. Those of skill in the art know additional emulsifiers for the emulsification of organofunctional silanes to form sol-gel emulsion that can be utilized in the emulsion present invention.

The phrase "organofunctional silanes" as used herein is intended to include, but is not limited to, silanes as sol-gel precursors for coating that are sterically hindered substituents located at silicon atoms. Preferably, the functional groups are vinyl, epoxy, mercapto, amino, and other similar groups. The sterically hindered substituents are isopropyl, t-butyl, cyclohexyl, and other similar substituents that provide lower reactivity and therefore higher stability in the aqueous environment. The sol-gel emulsion provides a thin, uniform, and dense film on surface to be treated that adheres extremely well on part's surface. The part surface, such as wood or plastics, is soft that is difficult to prepare a mirror finish smooth surface. The advantage of the sol-gel emulsion is that the emulsion produces a hard and high abrasion resistance layer on the relatively soft part's surface. This allows a mirror-finish flat surface be prepared for a high quality coating. This list is intended to exemplify, not limit, the organofunctional silanes that can be used in the emulsion of the present invention. Those of skill in the art know additional organofunctional silanes in emulsion that can be utilized in the emulsion of the present invention.

The phrase "pH adjusting agent" as used herein is intended to include, but is not limited to, the following agents: ammonia, acetic acid, trifluoroacetic acid, any acid, base, fluoride, and any other similar sol-gel catalyst known to those of skill in the art. This list is intended to exemplify, not limit, the pH-adjusting agents that can be used in the emulsion of the present invention. Those of skill in the art know additional pH adjusting agents that can be utilized in the emulsion of the present invention.

The conductive sol-gel emulsion can be applied on a surface to be treated by dip-coat, spray-coat, spin-coat, roller-coat, and any other similar coating techniques. After the application, the curing of wet sol-gel film, which is initiated by the heating, takes place. The mature sol-gel film can be accomplished by air-dried at room temperature, but a rapid thermal curing process is adaptable in an industrial process. The rapid thermal curing can be carried out in a heat oven or by using IR radiation or by other methods known to those of skill in the art. The short processing time in relation to the time for heat curing offers important advantages in industrial production such as a faster flow-through of work pieces and a reduced length of the plant in relation to what is necessary for a curing oven. Alternatively, the curing can take place using low temperature heating. For example, temperatures can be set in the range of 80 to 100° C. In the preferred embodiment, the object is heated to 90° C. for approximately one minute.

Once the conductive sol-gel emulsion coating is cured, the object can be polished to generate a mirror finish flat surface and is able to be powder coated using standard methods known to those of skill in the art. Alternatively, the object can be treated with any other process or treatment that requires the surface to be treated to be conductive.

The conductive sol-gel emulsion of the present invention creates a thin, uniform, and dense film on the surface of the object being treated. The benefit of the conductive sol-gel film is that the film adheres extremely well to the surface of the object. Additionally, the film provides the following beneficial characteristics: good wetting of the substrate, a uniformly conductive surface for attracting powder particles evenly to the part, a smooth and hard film (highly resistant to scratches) which results from the sol-gel emulsion filling in the pores of the object's surface, and a thermally stable sol-gel film (a flame retardant barrier) that seals a thermal sensitive surface (such as MDF or ABS) while limiting the moisture loss of the object during subsequent powder coating applications. One additional advantage of the present invention is that the hard sol-gel film can be polished into a mirror finish smooth surface for a high quality coating, whereas the relatively soft surface of wood or plastics cannot.

The phrase "sol-gel emulsion" as used herein is intended to describe standard sol-gel emulsions known to those of skill in the art. These sol-gels are prepared by standard methods known in the art and comprise both polysiloxane and non-polysiloxane type gels. These include, but are not limited to, polysiloxane-based gels with a wide range of substituted functional groups, including: methyl, phenyl, cyanoalkyl, cyanoaryl, etc. In addition, sol-gel polyethylene glycols such as, but not limited to, Carbowax and Carbowax Sentry brand PEG, sol-gel polyalkylene oxides (Superox products), sol-gel alkyl, and other sol-gels, such as sol-gel dendrimers can be modified by the instant invention.

In order to achieve the desired sol-gels of the instant invention, certain reagents in a reagent system can be utilized for the fabrication of the gels for the present invention. The reagent system can include two sol-gel precursors, a sol-gel active polymer or ligand, a deactivation reagent, one or more solvents and one or more a catalysts.

Typical non-sol-gel-active substituents of the sol-gel precursor include, but are not limited to, alkyl moieties and their derivatives, alkenyl moieties and their derivatives, aryl moieties and their derivatives, arylene moieties and their derivatives, cyanoalkyl moieties and their derivatives, fluoroalkyl moieties and their derivatives, phenyl moieties and their derivatives, cyanophenyl moieties and their derivatives, biphenyl moiety and its derivatives, cyanobiphenyl moieties and their derivatives, dicyanobiphenyl moieties and their derivatives, cyclodextrin moieties and their derivatives, crown ether moieties and their derivatives, cryptand moieties and their derivatives, calixarene moieties and their derivatives, liquid crystal moieties and their derivatives, dendrimer moieties and their derivatives, cyclophane moieties and their derivatives, chiral moieties, polymeric moieties, and any other similar non-sol-gel active moieties known to those of skill in the art.

In addition to the above mentioned and preferred precursors, other precursors can be used with the present invention. These precursors include, but are not limited to, moieties selected from the group of octadecyl, octyl, cyanopropyl, diol, biphenyl, and phenyl. Other representative precursors include, but are not limited to, Tetramethoxysilane, 3-(N-styrylmethyl-2-aminoethylamino)-propyltrimethoxysilane hydrochloride, N-tetradecyldimethyl(3-trimethoxysilylpropyl)ammonium chloride, N-(3-trimethoxysilylpropyl)-N-methyl-N,N-diallylammonium chloride, N-trimethoxysilylpropyltri-N-butylammonium bromide, N-trimethoxysilylpropyl-N,N,N-trimethylammonium cholride, Trimethoxysilylpropylthiouronium chloride, 3-[2-N-benzyaminoethylaminopropyl]trimethoxysilane hydrochloride, 1,4-Bis(hydroxydimethylsilyl)benzene, Bis(2-hydroxyethyl)-3-aminopropyltriethoxysilane, 1,4-bis (trimethoxysilylethyl)benzene, 2-Cyanoethyltrimethoxysilane, 2-Cyanoethyltriethoxysilane, (Cyanomethylphenethyl)trimethoxysilane, (Cyanomethylphenethyl)triethoxysilane, 3-Cyanopropyldimethylmethoxysilane, 3-Cyanopropyltriethoxysilane, 3-Cyanopropyltrimethoxysilane, n-Octadecyltrimethoxysilane, n-Octadecyldimethylmethoxysilane, Methyl-n-Octadecyldiethoxysilane, Methyl-n-Octadecyldimethoxysilane, n-Octadecyltriethoxysilane, n-Dodecyltriethoxysilane, n-Dodecyltrimethoxysilane, n-Octyltriethyoxysilane, n-Octyltrimethoxysilane, n-Ocyldiisobutylmethoxysilane, n-Octylmethyldimethoxysilane, n-Hexyltriethoxysilane, n-isobutyltriethoxysilane, n-Propyltrimethoxysilane, Phenethyltrimethoxysilane, N-Phenylaminopropyltrimethoxysilane, Styrylethyltrimethoxysilane, 3-(2,2,6,6-tetramethylpiperidine-4-oxy)-propyltriethoxysilane, N-(3-triethoxysilylpropyl)acetyl-glycinamide, (3,3,3-trifluoropropyl)trimethoxysilane, (3,3,3-trifluoropropyl)methyldimethoxysilane, 3-mercaptopropyltrimethoxysilane,,3-mercaptopropyltrimethoxysilane, 3-mercaptopropyltriethoxysilane, mercaptomethylmethyldiethoxysilane, 3-mercaptopropylmethyldimethoxysilane, 3-mercaptopropyloctadecyldimethoxysilane, 3-mercaptopropylmethyldimethoxysilane, 3-mercaptopropylcyanopropyldimethoxysilane, 3-mercaptopropyloctadecyldiethoxysilane, and any other similar precursor known to those of skill in the art.

The deactivation reagents include, but are not limited to, hydrosilanes, polymethylhydrosiloxlanes, polymethylphenyl hydrosiloxanes, polymethyl cyanopropyl hydrosioloxanes, and any other similar deactivation reagent known to those of skill in the art. The primary catalyst includes, but is not limited to, trifluoroacetic acid, any acid, base, fluoride, and any other similar catalyst known to those of skill in the art.

The preparation of the sol-gel coating includes the steps of providing the object to be treated, providing a sol-gel solution including one or more sol-gel precursors, an organic material with at least one sol-gel active functional group, one or more sol-gel catalysts, one or more deactivation reagents, and a solvent system. The sol-gel solution is then reacted with the surface of the object under controlled conditions to produce a surface bonded sol-gel coating on the portion of the tube. The free portion of the solution is then removed from the object under pressure, purged with an inert gas, and is heated under controlled conditions to cause the deactivation reagent to react with the surface bonded sol-gel coating to deactivate and to condition the sol-gel coated portion of the tube structure. Preferably, the sol-gel precursor includes an alkoxy compound. The organic material includes a monomeric or polymeric material with at least one sol-gel active functional group. The sol-gel catalyst is taken from the group consisting of an acid, a base and a fluoride compound, and the deactivation reagent includes a material reactive to polar functional groups (e.g., hydroxyl groups) bonded to the sol-gel precursor-forming element in the coating or to the tube structure.

The emulsion of the present invention creates a thin, uniform, and dense film on the surface of the object being treated. The benefit of the film is that the film adheres extremely well to the surface of the object. Additionally, the film provides the following beneficial characteristics: good wetting of the substrate, a uniformly conductive surface for attracting powder particles evenly to the part, a smooth and hard film (highly resistant to scratches) which results from the sol-gel emulsion filling in holes the object's surface, and a thermally stable sol-gel film that seals a thermally sensitive surface while limiting the moisture loss of the object during subsequent powder coating treatments. The hard sol-gel film on a soft part's surface (wood and plastics) can be polished to give a mirror-finish smooth surface that is essential for a high quality powder coating.

The emulsion can be pigmented or non-pigmented depending upon the desired coating. The non-pigmented coating renders the underlying surface visible (optically transparent), something, which is often desired with wooden objects.

Good leveling at a low melting temperature can be obtained because the powder is at least partly composed of polymers such as polyester, in addition to leveling agents. Curing by ultraviolet radiation within the wavelength range 350–400 nm can be attained if polymers are admixed with initiators.

The emulsion can be further modified to obtain additional desirable properties. For example, a clear layer that does not conceal the underlying surface can be obtained after curing from a polymer powder containing no pigmentation or dyes. If a non-transparent layer is desired, such as opaque, white, black or other color, pigments or other dyestuffs can be added.

Gloss of the coated surface can be controlled by means of additives. However, such additives can also produce changes in the necessary properties of low melting point and possibility for UV curing. These factors must be taken into account when composing the powder and when implementing the method.

The object must be prepared in order to retain the emulsion on its surface. For example, the object to be coated is pre-heated to a low temperature. The object is assumed to have a limited heat resistance; examples of such objects are wooden objects, pressed objects (i.e. wood fiber-board), plastic objects, and also objects made of reinforced plastics and/or with a high addition of filler. The fact that a material has a low heat resistance, such as wood and a majority of plastics, generally also implies that it is non-conductive. Materials having high heat resistance are typically construction metals, which are conductive. The present invention is not limited to non-conductive objects but can advantageously be applied to objects having nonconductive surfaces and no pretreatment for achieving conductive properties has to take place. However, as earlier mentioned, the method can also be applied to solid objects, e.g. cast iron bodies, in order to reduce the energy consumption required for heating.

Examples of pre-heating methods are: convection using a heated air flow, infrared (IR) radiation, or in exceptional cases, such as when plates are to be coated only on one side heating, by conduction from heated surfaces. Particularly useful is a method in which simultaneous heating takes place by convection of an air stream and by IR radiation. The IR radiation gives a rapid and comparatively deep heating of the surfaces it strikes. The airflow gives a temperature that is very uniformly distributed over the surfaces of the object. This is also useful with objects having a very complicated outer shape and when IR radiation does not reach all surface sectors.

One-way to retain the emulsion on the surface of the object is to pre-heat the object to a temperature so high that the emulsion hitting the surface of the object sticks to the surface. However, this does not work when coating heat sensitive objects, which cannot be heated to a temperature considerably over 100° C. If the object is pre-heated to a lower temperature this temperature cannot be maintained until the object is moved to the place where the emulsion application is performed. Pre-heating by melting the powder particles by the application does not work when coating heat sensitive materials such as wood and wood-based materials.

Another embodiment of the present invention provides an emulsion coating made of materials that absorb atmospheric humidity to some extent, such as wood and wood-based materials. When using this coating, pre-heating is done but not adapted for obtaining sticking of the emulsion during the spraying. The effect is that the heating produces humidity on the surface of the object, which forms condensation thereby making the surface conductive. To get this process work it is necessary to control certain factors: the humidity of the product, the heating process so that condensation is produced, but not overheating of the object so that the condensation is completely vaporized. It is also necessary that movement of the object to the emulsion application location be done under conditions that do not affect the conductive properties of the object.

Pre-heating takes place in a chamber, established for that purpose, in a plant where the objects to be coated can be transported between different chambers or work stations intended for carrying out the method steps of the present invention.

Preferably, spraying is performed in a controlled environment. As previously mentioned, the temperature cannot be too high because the emulsion can be very sensitive to being sticky such that larger granules can be formed. The temperature range should be about 10–40° C., and preferably about 15–25° C. in the spraying chamber. A temperature near the common room temperature, about 20° C. or even lower, is preferred. It is also important to control the humidity of the air. The relative humidity should be in the range of 20–80 percent relative humidity, and preferably about 50–60 percent in the spraying chamber.

For an object that is not heat sensitive, the temperature can be maintained at least as high necessary. The particles arrive in a tacky state and are deposited on the surface of the object when the particles impact the object. When treated in this manner, the respective objects receive a covering, but without re-flow or an uncured, layer of the polymer-based coating material.

If pre-heating is done to a temperature considerably over the mentioned temperature adapted to the spraying operation, it is necessary to divide the pre-heating and spraying chambers by means of an airlock so that heated air from the pre-heating chamber does not reach the spraying chamber to such an extent that it disturbs the spraying process.

Intermediate tempering can also be included in the coating. Curing through UV radiation can be used in order to obtain a finished coating. At least in certain cases it can be desirable to adjust the condition of the applied, sticky coating layer. Such an adjustment of the layer can be done by means of cooling.

In certain cases there can be a risk that after heating the layer reaches such a fluent state that there is a risk of running and drops forming at protruding edges because of continued heating by means of conduction from the heated object. In order to prevent this, cooling can be undertaken, thus lowering the temperature, which was necessary for adhesion of the particles of the emulsion, to a temperature where the formed layer obtains a more solid state.

After the application, the curing, which is initiated by the heating, takes place. The present method is aimed at carrying out the process at such a low temperature that no curing is attained by the heating or, in any case, requires such a long time after initiation that it would be unfeasible in an industrial process. The curing must therefore be accomplished in another way; that is, by means of initiation of the curing process by ultraviolet radiation.

The curing takes place at different UV wavelengths, depending on how the powder is pigmented and which photoinitiator has been added. A UV spectrum situated in the lower region, 250–350 nm, is convenient, whereby it is assumed that a photoinitiator, which absorbs within this range is utilized. There are also lamps having a maximum at 350–400 nm and at 400–450 nm and there are also photoinitiators, which absorb at these large wavelengths. One can also pigment a UV-curing powder coating in many different ways. The pigment must in all cases be adapted to the right photoinitiator and lamp.

High intensity lamps can imply that it is easier to cure thick layers and to increase the curing rate. The object, which is to be cured, does not have to be in focus but the intensity at a certain distance must be sufficient. This is especially evident when a clear coating is concerned, however, for pigmented systems it is more important that the intensity be as high as possible.

The UV curing takes place in a curing chamber adapted for that purpose. The objects are brought into the curing chamber after the powder spraying and the optional intermediate tempering. In the curing chamber, a number of UV radiators are arranged from which the radiation should reach all coated surfaces of the object. For certain objects having a complicated shape and a coating on many different sides, special layouts can be necessary. Thus, it can be necessary to arrange a large number of UV radiators directed in different ways. The UV radiators can be complemented with mirrors for redirecting the radiation at new angles. The UV rays can also be made to move around the respective objects.

Optionally, the objects can be rotated or moved in another way in front of the radiation sources.

When the radiation strikes the coating layer, the initiator system of the material starts the polymerization. It is thereby possible to conduct this very rapidly; times as fast as two seconds are possible. The short processing time in relation to the time for heat curing offers important advantages in industrial production such as a faster flow-through of work pieces and a reduced length of the plant in relation to what is necessary for a curing oven.

In most cases cooling can take place simultaneously with the UV radiation. By means of an adapted cooling, the temperature during the curing can be prevented from reaching disadvantageously high numbers because of energy contribution from the flow of heated objects, and particularly because the lamps for the UV radiation will also emit IR radiation. Such cooling during the UV radiation is assumed in the present embodiment.

Alternatively, the curing can take place using low temperature heating, for example, temperatures in the range of 80 to 100° C. In the preferred embodiment, the object is heated to 90° C. for approximately one minute.

Once the coating is cured, the object is able to be powder coated using standard methods known to those of skill in the art.

Throughout this application, author and year and patents by number reference various publications, including United States patents. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the described invention, the invention can be practiced otherwise than as specifically described.

What is claimed is:

1. An emulsion for preparing a low-conductivity surface for coating, said emulsion comprising an emulsified organofunctional silane solution, wherein said solution includes water, emulsifiers, organofunctional silane, electrical conducting metal particles, and pH adjusting agents.

2. The emulsion according to claim 1, wherein said water is present in a range of 80–90% by weight.

3. The emulsion according to claim 1, wherein said emulsifier is present in a range of 0.1–5% by weight.

4. The emulsion according to claim 3, wherein said emulsifier is selected from the group consisting essentially of specialty ethoxylates, sorbitan based derivatives, and other similar emulsifiers.

5. The emulsion according to claim 1, wherein said organofunctional silane is present in a range of 4–10% by weight.

6. The emulsion according to claim 5, wherein said organofunctional silane is at least one silane with sterically hindered substituents located at silicon atoms.

7. The emulsion according to claim 6, wherein said sterically hindered substituents are selected from the group consisting essentially of isopropyl, t-butyl, cyclohexyl, and similar substituents that provide lower reactivity and therefore higher stability in the aqueous environment.

8. The emulsion according to claim 1, wherein said electrical conducting metal particles are present in a range of 0.2–1% by weight.

9. The emulsion according to claim 8, wherein said electrical conducting metal particles are selected from the group consisting essentially of ZnO:Al (AZO), $SnO_2$:Sb (ATO), $In_2O_3$:Sn (ITO), $SnO_2$:F (FTO), and similar conductive metal/metal oxide particles.

10. The emulsion according to claim 1, wherein said pH adjusting agents are present in trace amounts.

11. The emulsion according to claim 10, wherein said pH adjusting agents are selected from the group consisting essentially of ammonia, acetic acid, trifluoroacetic acid, any acid, base, fluoride, and other similar sol-gel catalyst.

12. The emulsion according to claim 1, wherein said low-conductivity surface is selected from the group consisting essentially of wood fiber and plastic.

13. The emulsion according to claim 1, wherein said emulsion is in the form of a coating on the surface.

14. A non-conductive object having applied to an exterior surface the emulsion according to claim 1.

15. The object according to claim 14, wherein said object is made of a material selected from the group consisting essentially of wood, wood fibers, and plastic.

16. A method of making a surface conductive by applying to the surface an emulsion comprising an emulsified organofunctional silane solution, wherein the solution includes water, emulsifiers, organofunctional silane. electrical conducting metal particles, and pH adjusting agents.

* * * * *